United States Patent [19]
Goto

[11] 3,984,851
[45] Oct. 5, 1976

[54] FILM FORWARDING MEANS
[75] Inventor: Toshio Goto, Omiya, Japan
[73] Assignee: Fuji Photo Film Co., Ltd., Minami-ashigara, Japan
[22] Filed: May 30, 1975
[21] Appl. No.: 582,519

[30] Foreign Application Priority Data
June 6, 1974 Japan............................. 49-64781

[52] U.S. Cl............................. 354/212; 354/170
[51] Int. Cl.² ............................................. G03B 1/22
[58] Field of Search ........... 354/170, 171, 172, 173, 354/212, 213, 214, 90; 352/191, 192, 193, 186

[56] References Cited
UNITED STATES PATENTS
2,534,837   12/1950   Traversa ............................. 354/171
3,416,424   12/1968   Harvey............................... 354/170
3,653,309   4/1972   Ochai................................. 354/170

Primary Examiner—L. T. Hix
Assistant Examiner—E. M. O'Connor
Attorney, Agent, or Firm—Sughrue, Rothwell, Mion, Zinn and Macpeak

[57] ABSTRACT

A film forwarding means comprising film engagement means reciprocally slidable between initial and terminal positions, actuation means moveable between initial and terminal positions and able to cause forward movement of the engagement means, and rotary drive means for driving the actuation means. The engagement means may not change direction while travelling between its initial and terminal positions, but the actuation means may be moved independently of the engagement means if contacted by the drive means during return to its initial position, whereby stopping position of the drive means between successive film exposures is not critical.

3 Claims, 7 Drawing Figures

FILM FORWARDING MEANS

BACKGROUND OF THE INVENTION

1. Field of the Invention

The present invention relates to a film forwarding means. More particularly, the invention relates to a means for use in association with a camera employing film in the form of individual film units and for forwarding successive film units from an exposure station in a camera and into engagement with processing rolls or similar means in the camera.

2. Description of the Prior Art

There is known a photographic process, frequently referred to as 'auto-process', according to which film is provided not in roll form but in the form of individual units each of which comprises at least a negative image layer and a transfer image layer and has associated therewith processing solution contained in breakable pods, which are usually embedded in an edge portion of the film unit. The negative image layer is exposable to form a negative or latent image of an object, and a corresponding, viewable image may be formed on the transfer image layer under the influence of the processing solution, which is extruded from the pods and spread through the film unit under the action of pressure means between which the film unit is passed subsequent to exposure, which are conveniently provided as processing rolls, for example, mounted inside the associated auto-process camera, and which also act to move the film unit to the exterior of the camera, whereby a finished photographic print may be made available to a photographer in a very short time after a film unit is exposed, without it being necessary for the photographer to proceed to a separate, specially equipped location for development and processing of film. An auto-process camera must therefore include means for positioning successive film units at an exposure station, processing rolls or other pressure means for processing exposed film units and moving the film units to the exterior of the camera, and means for forwarding successive film units from the exposure station to the processing rolls.

Conventionally, a film forwarding means is proposed by the Japanese Patent Application Ser. No. 49-30332 entitled 'Film Forwarding Means' filed on Mar. 15, 1974 by the same assignee, in which application, there is disclosed means comprising a film engagement means which is reciprocally slidable between initial and terminal positions, carries a hook means to engage a film unit at an exposure station and draw the film unit from the exposure station and into engagement with processing rolls provided in a camera, and is caused to move by an actuation means which is itself actuated by a rotary drive element, which is rotatable about a fixed axis, and while moving over a certain portion of the rotary path travelled thereby causes the actuation means to move forwards, i.e., in a direction to cause forwarding of an exposed film unit. Each time the film engagement means reaches the terminal position it is retained thereat, together with the actuation means, be a retainer means until the camera shutter release means is actuated to effect exposure of the next film unit, whereupon the engagement means and actuation means are released and are returned to initial positions by the action of a spring means. During this return movement, it is necessary that the rotary drive be at a position, or be travelling over that portion of its rotative path wherein the same cannot contact the actuation means, since otherwise the film engagement means is liable to be moved into engagement with the retainer means before the former has moved to its initial position in order to engage the film unit which has just been exposed, and which would therefore fail to be forwarded. Accurate control of movement of the rotary drive means to cause stopping thereof in a required position is of course possible with conventionally known means, but such control means, being precision elements, are comparatively expensive and so increase camera cost accordingly, and also require extra space in a camera.

Accordingly, an essential object of the present invention is to provide a film forwarding means for use in a camera employing film in the form of individual film units which is simple in construction and can be manufactured at low cost with substantial elimination of the disadvantages inherent in the conventional film forwarding means.

Another important object of the present invention is to provide a film forwarding means of the above described type which is accurate in functioning, including a rotary drive means which is not required to be stopped in an exact position.

A further object of the present invention is to provide a film forwarding means of the above described type which is compact in size and readily incorporated in the camera with minimum space requirements.

SUMMARY OF THE INVENTION

In accomplishing these and other objects there is provided, according to the present invention, a film forwarding means comprising a first slide plate means which carries a hook means for engagement of film units, is reciprocally slidable between an initial position and a terminal or displaced position, is constantly urged towards the initial position by a first spring means, is engaged by a retainer means when the same reaches the terminal position, after forwarding of each film unit, and is associated with a pawl and rack means which prevents reverse movement thereof during travel between the initial and terminal positions. The first slide plate means is caused to move forwards, to move a film unit from an exposure station, by an actuation means constituted by a second slide plate means which is positioned parallel to the first slide plate means and is connected thereto by a second spring means which is somewhat stronger than the first spring means and normally acts to draw the first and second slide plate means into constant given positions relative to one another, irrespective of other movement performed by the first and second slide plate means. There is also provided a rotary drive means in the form of a pin which is attached to the peripheral portion of a crank plate, and which while travelling over a certain portion of the rotary path thereof causes the second slide plate means to move forwards, whereupon the second spring means draws the first slide plate means also forwards and moves an exposed film unit into engagement with processing rolls. After forwarding of a film unit, the first slide plate means and hence second slide plate means are retained at terminal positions by the retainer means until disengaged due to the action of means connecting to the shutter release means upon exposure of the next film unit, whereupon the first spring means draws the first and second slide plate means back to their initial positions, and the rotary drive means is simultaneously actuated ready to cause forwarding of this next exposed film unit. If the second slide plate means comes into contact with the rotary drive means during this return movement, the second slide plate means may be moved back as the drive means rotates. However, the rack and pawl means prevents the first slide plate means from moving back, and the first slide plate means is simply halted, while the second spring means is extended to permit the second slide plate means to be pushed by the drive means slightly out of its normal position relative to the first slide plate means. The drive means continues to rotate and is moved out of contact with the second slide plate means, whereupon the second slide plate means is again drawn into its normal position relative to the first slide plate means and the first spring means is allowed to draw the first and second plate means to their initial positions. As the drive means continues to rotate, the first and second plate means are again moved to their terminal positions, thereby forwarding the exposed film unit, after which the rotary drive means may be stopped in any position. The invention thus eliminates the need for provision of means for precision control of the rotary drive means, and so reduces cost and space requirements of an auto-process camera.

In another embodiment of the invention, there is provided a film unit draw means comprising a slide plate carrying a hook means and a first pivotal lever which connects with and may cause forward movement of the slide plate, and an actuation means constituted by a second pivotal lever which is urged into alignment with the first lever by a spring means serving the same function as the second spring means described above.

A better understanding of the present invention may be had from the following full description of several preferred embodiments thereof when read in reference to the attached drawings, in which like numbers refer to like parts.

DESCRIPTION OF THE PREFERRED EMBODIMENT

Figure 1:
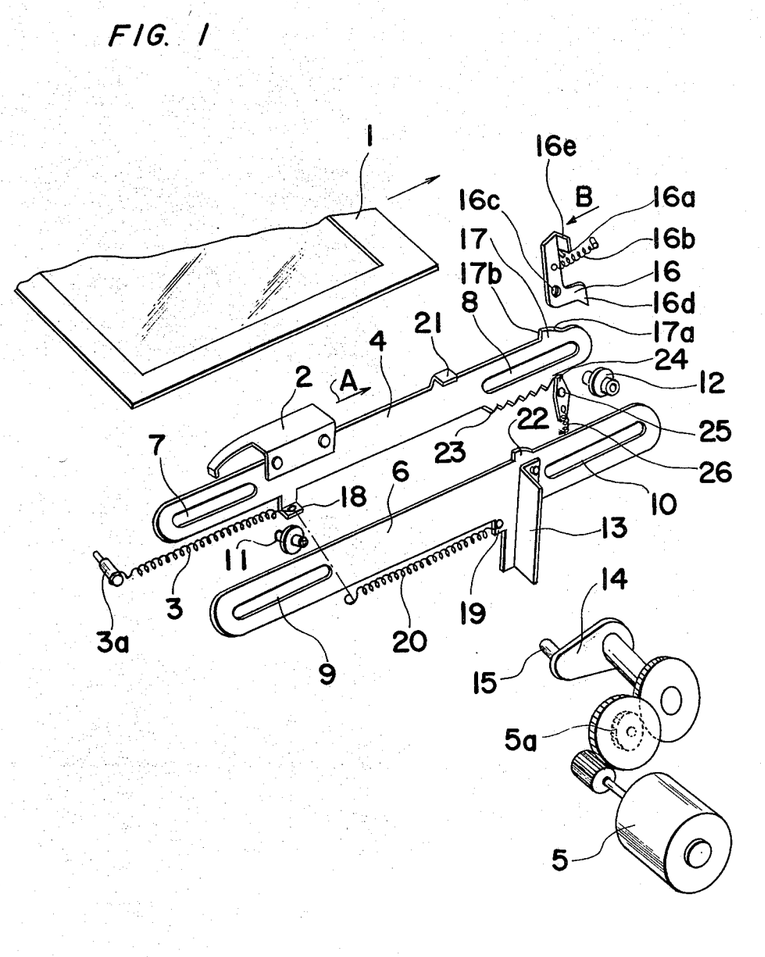
FIG. 1 is a schematic exploded perspective view of a film forwarding means according to a preferred embodiment of the invention, FIG. 2 (a) through (e) are explanatory views in illustration of action of the means of FIG. 1.
Figure 2:
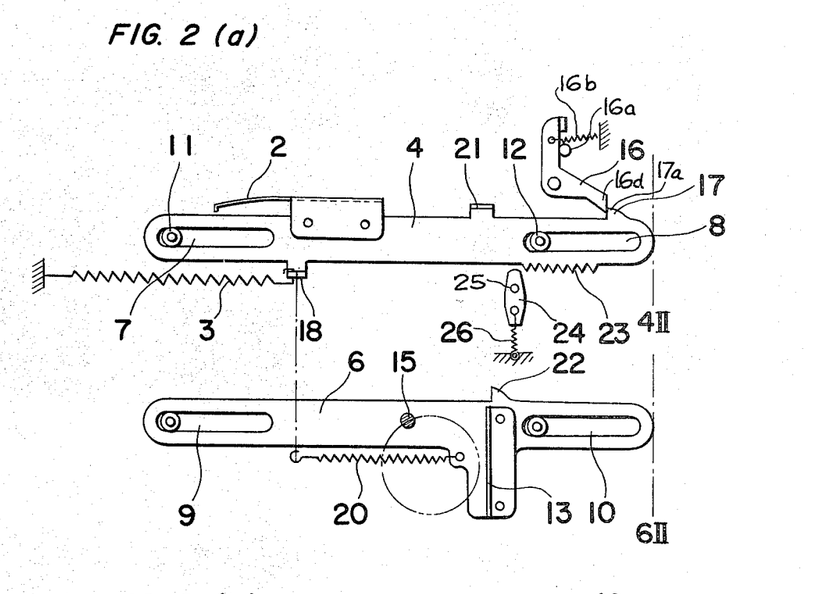

Referring to FIGS. 1 to 2 (a) through 2 (e), there is shown a film forwarding means comprising a first slide plate 4 and a second slide plate 6, each of which is comparatively long and generally ellipsoidal or rectangular. In the first slide plate 4, near opposite ends thereof, there are formed elliptical slots 7 and 8 having their long axes disposed generally in line with the longitudinal axis of the plate 4. Similarly disposed slots, 9 and 10, are formed in the second plate 6. The first slide plate 4 and second slide plate 6 are reciprocally slidable along a line parallel to the line along which a film unit 1 is required to be advanced in order to be moved from an exposure station, direction of film unit advance being from left to right in the drawings, as indicated by the arrow A. The first slide plate 4 and second slide plate 6 are guided in their reciprocal motion by a pair of pins 11 and 12 which are provided between the first and second plates 4 and 6 and are each fixedly mounted in a fixed portion of the camera body (not shown), the pin 11 having one end portion extending through the slot 7 of the first plate 4 and the opposite end portion extending through the slot 9 of the second plate 6, and the pin 12 similarly having opposite end portions extending through the slots 8 and 10. Reciprocal motion of the first slide plate 4 is between a position 4I, which is a leftmost position as seen in FIG. 2(d), and a right-hand end position 4II shown in FIG. 2(a), the second slide plate 6 being moveable between corresponding positions 6I and 6II.

The first slide plate 4 carries a fixedly attached hook element 2 which is slightly flexible, and is able to engage a slot, perforation, or similar engagement portion (not shown) of a film unit 1. When the first slide plate 4 is at the position 4I, the hook element 2 is brought into a position in which it engages a film unit 1 at the exposure station in the camera. The first slide plate 4 is normally urged to the position 4I by a tension spring 3 which has one end fixedly attached to a fixed pin 3a mounted in a left-hand portion of the camera and the other end to a spring mount projection 18 which is in integral attachment to the first plate 4. When the first slide plate 4 is moved, in a manner described below, from the position 4I to the position 4II, the hook element 2 pulls the film unit 1 from the exposure station and draws the film unit 1 forwards a sufficient distance for the leading edge thereof to be brought into engagement with, for example, processing rolls not shown.

At the top edge of the first slide plate 4, near the right-hand end thereof, there is formed an integrally attached latch portion 17, which comprises a suitably sloped right-hand face 17a and a vertical left-hand face 17b, and is engageable by a retainer means 16. The retainer means 16 is pivotally mounted on a fixed pin 16c, and comprises a hook end portion 16d for engagement with the latch potion 17, and a terminal plate portion 16e which may be pushed by an element associated with the camera shutter release means (not shown), the hook end portion 16d and terminal plate portion 16e being on opposite sides of the pin 16c. The retainer means 16 is normally urged by a spring means 16b to pivot in a clockwise direction, as seen in the drawing, and comes into contact with a fixed pin 16a which prevents further clockwise movement thereof. When the first slide plate 4 is brought to the position 4II, the right face 17a of the latch portion 17 slides against the outer side of the hook end portion 16d of the retainer means 17, which is thereby pivoted counterclockwise slightly and permits the latch portion 17 to pass, after which the retainer means 16 is pivoted clockwise again by the spring means 16b, into contact with the pin 16a, and brought into a position wherein the hook end portion 16d thereof may be engaged by the steep face 17b of the latch portion 17, whereby leftward movement of the first slide plate 4 is prevented. The retainer means 16 may be disengaged from the latch portion 17 by pressure which is applied on the plate portion 16e in the direction indicated by an arrow B upon exposure of a film unit, and causes the retainer means 16 to pivot a considerable amount counterclockwise.

A lower edge portion of the first slide plate 4 defines a toothed rack 23 which has a length generally equal to the distance over which the first slide plate 4 travels when moved between the position 4I to the position 4II, or vice versa. The rack 23 is engageable by a pawl element 24 which is pivotally mounted on a fixed pin 25 below the first slide plate 4 and has attached to the lower end thereof one end of a small spring 26, whose other end is fixedly attached to a lower point of the camera interior vertically below the pin 25 and so acts to urge the pawl element 24 into a vertical alignment. When the first slide plate 4 is at either the position 4I or position 4II, the rack 23 is brought out of engagement with the pawl element 24, which may therefore be held vertical by the spring 26. During movement of the first slide plate 4 between the positions 4I and 4II, the pawl element 24 is pivoted out of a vertical alignment by the rack 23 which is thereby allowed to slide past the pawl element 24 and permits movement of the first slide plate 4. However, the first slide plate 4 cannot be moved back during movement between the positions 4I and 4II, i.e., once the first slide plate 4 has started to be moved from the position 4II to the position 4I, for example, the pawl element 24 is pivoted counterclockwise by the rack 23 and at the same time is urged clockwise by the spring 26, thus permitting leftward movement of the first slide plate 4, but being immediately brought into blocking engagement with the rack 23 if it is attempted to move the first slide plate 4 rightwards. Therefore, before the first slide plate 4 can be moved back to the position 4II, the former must be moved completely to the position 4I, in order to bring the rack 23 out of engagement with the pawl element 24 and so permit the pawl element 24 to be brought into a vertical alignment again by the spring 26, after which the pawl element 24 may be pivoted counterclockwise to permit rightward movement of the first slide plate 4.

At a generally central portion of the upper edge of the first slide plate 4, there is formed a small integral contact projection 21 which extends forwardly at right-angles to the first plate 4, i.e., away from the film unit exposure station and laterally toward plate 6, and is engageable by a vertical catch projection 22 which is in integral attachment to the upper edge of the second slide plate 6.

Referring particularly to FIG. 1, the second slide plate 6 has main dimensions which are generally the same as those of the first slide plate 4. The catch projection 22 is formed somewhat closer to the right-hand end of the second plate 6 than is the contact projection 21 to the right-hand end of the first plate 4. During action of the slide plates 4 and 6, the catch projection 22 either lies to the right of, or contacts the right-hand edge of the contact projection 21. Generally in line with the catch projection 22, the second slide plate 6 includes a downwardly extending mount portion 19. The slide plates 4 and 6 are connected by a tension spring 20, which has one end attached to the second slide plate mount portion 19 and the other end to the spring mount projection 18 of the first slide plate 4, and which acts to draw the plates 4 and 6 rightwards and leftwards with respect to one another and into relative positions wherein the contact projection 21 is contacted by the catch projection 22. The spring 20 is sufficiently stronger than the spring 3 to maintain this contact between the projections 21 and 22 even when the spring 3 is extended, whereby if the second slide plate 6 is moved rightwards, the first slide plate 4 may also be drawn rightwards, counter to the force of the spring 3.

A vertically mounted angle plate 13 is fixedly attached to the second slide plate 6 in line with the mount portion 19, the angle plate 13 having a base portion affixed to the mount portion 19, and having one side extending forwards at right-angles to the second slide plate 6. The angle plate 13 is contactable by a pin 15 fixedly attached to and extending rearwardly from and at right angles to a crank plate 14 which is rotatable by a drive force supplied thereto by a motor 5 acting through a suitable gear train 5a. During part of the rotation of the crank plate 14 the pin 15 may press against the angle plate 13 and cause the second slide plate 6 to move to the position 6II, the second slide plate 6 being brought to the position 6II when the pin 15 reaches the rightmost point of its rotary travel.

Referring to FIGS. 2(a) to 2(e), action of the above described means is as follows. In between exposures, the first slide plate 4 and second slide plate 6 are held at their respective positions 4II and 6II due to engagement of the first plate 4 by the retainer means 16 and action of the spring 20, as indicated in FIG. 2(a). When the first slide plate 4 is thus retained, there is a slight clearance between the left-hand end of the slot 8 thereof and the guide pin 12. In FIG. 2(b), when the shutter release means is actuated to expose a film unit at the exposure station, force applied in the direction of the arrow B on the retainer terminal plate portion 16e causes the retainer means 16 to pivot counterclockwise, whereupon the retainer hook end portion 16d pushes the first slide plate 4 rightwards slightly, this movement being permitted by the clearance between the pin 12 and left-hand end of the first slide plate slot 8, and is then moved completely out of engagement with the first slide plate 4, which may therefore be drawn towards position 4I by the tension of spring 3, the second slide plate 6 being simultaneously moved towards position 6I because of the action of spring 20. Simultaneously with shutter release action, the motor 5 is started and causes rotation of the crank plate 14 and pin 15.

Figure 2C:
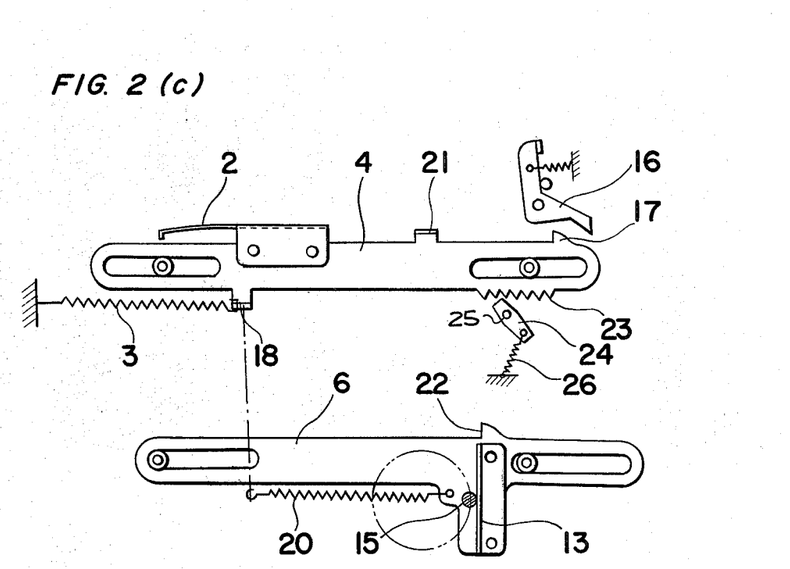
Figure 2D:
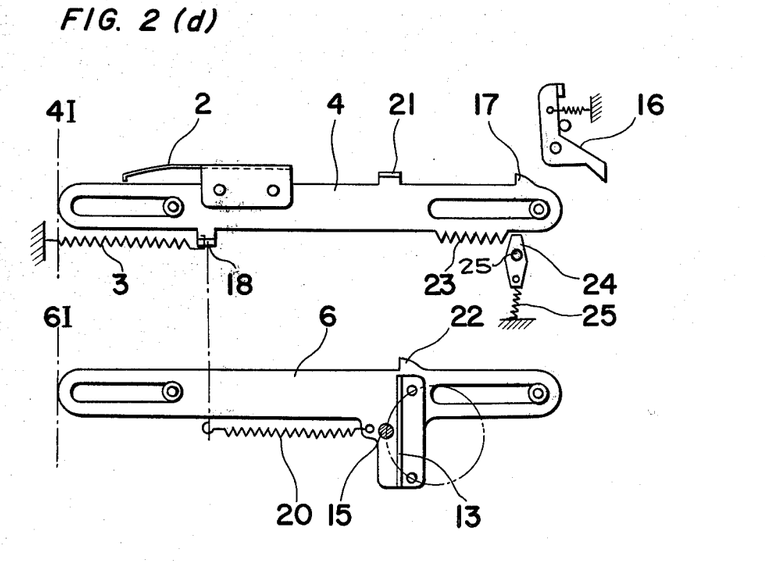

In FIG. 2(b) and FIG. 2(c), during movement of the slide plates 4 and 6, if the pin 15 is brought into contact with the angle plate 13 of the second slide plate 6, the second plate 6 is temporarily moved back to the position 6II, whereby rightwards acting pressure is exerted on the first slide plate 4 by the spring 20. However, at this stage rightward movement of the first slide plate 4 is prevented due to engagement of the pawl element 24 with the rack 23. When the pin 15 passes its rightmost position, the second slide plate 6 is drawn back by the spring 20 to its normal position relative to the first slide plate 4, and the slide plates 4 and 6 are drawn completely to their respective positions 4I and 6I due to the action of the spring 3, as shown in FIG. 2(d). As the crank plate 14 continues to rotate, the pin 15 is again brought into contact with the angle plate 13, as shown in FIG. 2(e), the slide plates 4 and 6 are moved rightwards, and the film unit just exposed is forwarded by the first slide plate 4 until the first slide plate 4 is again brought into engagement with the retainer means 16, as shown in FIG. 2(a). After this, the pin 15 may be stopped in any position, since irrespective of the position at which the crank plate 14 and pin 15 are stopped, there is no risk of the first slide plate 4 being moved to position 4II before the same has been brought to the position 4I and into engagement with the film unit next exposed. In other words, the means of the invention provides efficient forwarding of film units without requiring any special, costly control means.

Figure 3:
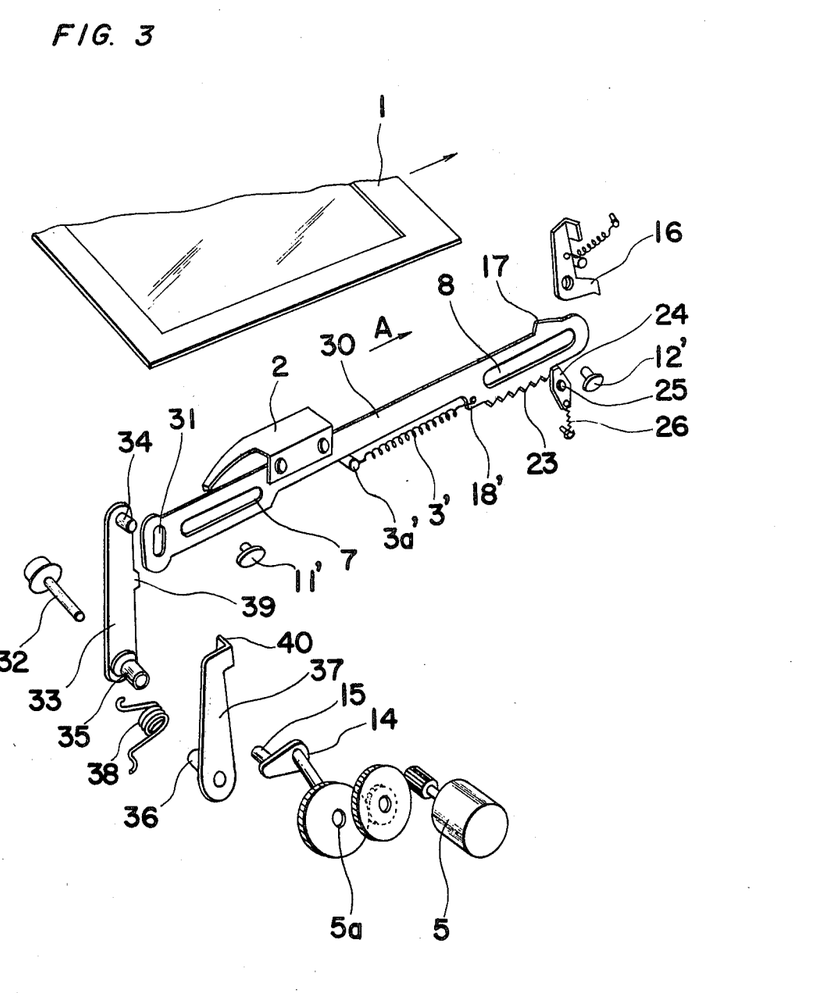
FIG. 3 is a schematic exploded perspective view showing a modification of the film forwarding means of the embodiment of FIG. 1.

Referring now to FIG. 3, there is shown a modification of the embodiment of FIG. 1 wherein the second slide plate 6 described as employed in the embodiment of FIG. 1 is dispensed with, and a slide plate 30 is adopted together with an upwardly extending first pivotal lever 33 and second pivotal lever 37 mentioned later. The slide plate 30 is generally similar in construction to the first slide plate 4 of FIG. 1, but the projection 21 and the spring mount projection 18 described as formed in the first slide plate 4 are dispensed with, and the slide plate 30 is normally urged leftward to the initial position by a compression spring 3' which has one end fixedly attached to a fixed pin 3a' mounted in the camera adjacent to the lower edge of the slide plate 30 and the other end to a spring mount projection 18' formed on the plate 30 close to a left end portion of the rack 23, while a left end portion of the plate 30 somewhat enlarged is formed with a vertically aligned slot 31. The slide plate 30 is slidably guided in its reciprocal motion by a pair of pins 11' and 12' each having one end portion extending through the slot 7 or 8 and fixedly mounted in a fixed portion of the camera not shown. Other constructions of the slide plate 30, the retainer means 16, the pawl element 24 and drive means including the pin 15 and lever 14 are similar to the embodiment of FIG. 1, so that detailed description thereof is abbreviated for brevity. In this modification, successive film units 1 are moved from an exposure station by the slide plate 30, which, like the first slide plate 4 of the embodiment of FIG. 1, is reciprocally slidable between initial and terminal or displaced positions, is urged to the initial position by the compression spring 3, is retainable at the terminal position by the retainer means 16, defines the rack portion 23 engageable by the pawl element 24 for preventing reverse movement thereof, and carries the hook element 2 for engagement with film units 1. The slide plate 30 has its left-hand end portion provided with the vertically aligned slot 31, as mentioned above. The upwardly extending first pivotal lever 33 is pivotal about a fixed horizontal shaft 32 passing through a sleeve 35 formed at the lower end of the first pivotal lever 33, and has, in fixed or integral attachment to the upper end thereof, a pin 34 which extends forwards and through the slot 31 at the end of the slide plate 30. The fixed pivot shaft 32 also passes through a sleeve 36 formed at the lower end of the upwardly extending second pivotal lever 37, which is parallel to the first pivotal lever 33, and whose upper end defines a right-angled rearward extension 40 which may contact a small projection 39 formed at the right-hand edge of the first lever 33. The left-hand side of the second pivotal lever 37 is contactable by the pin 15 which is mounted on the crank plate 14 rotatable due to action of the motor 5 through a gear train 5a and may cause the second pivotal lever 37 to pivot clockwise as seen in the drawing. On the sleeves 35 and 36 there is mounted a wire spring 38 which has one end engaging the left-hand side of the first lever 33 and the opposite end the right-hand side of the second lever 37, and acts to move the first lever 33 and second lever 37 clockwise and counterclockwise respectively, whereby the second lever extension 40 is normally pressed against the first lever projection 39. The wire spring 38 exerts a force somewhat greater than that exerted by the compression spring 3, whereby, presuming rightward movement of the slide plate 30 is unopposed by the pawl element 24, when the second lever 40 is pivoted clockwise by the pin 15 the first lever 33 is drawn into alignment with the second lever 37, and the pin 34 at the top end of the first lever 33 slides in the slot 31 of the slide plate 30 and simultaneously pushes the slide plate 30 rightwards to effect forwarding of a film unit 1. If the pin 15 contacts the second lever 37 during movement of the slide plate 30 from its terminal to its initial position, the second lever 37 may be temporarily moved out of its normal alignment relative to the first lever 33, counter to the force of the wire spring 38, while the slide plate 30 is prevented from being immediately moved to its terminal position due to engagement of the rack portion 23 by the pawl element 24.

It should be noted here that, although in the foregoing embodiment and the modification thereof, the film unit in the form of a sheet is described as employed, the film forwarding means of the invention is applicable to a film in a roll form having one perforation per one shot or film frame.

It should also be noted that the driving source for the driving means is not limited to the electrical motor 5 described as employed in the embodiment of FIG. 1 and the modification of FIG. 3, but a conventional coilspsring means or spring motor means may be adopted for that purpose.

As is clear from the foregoing description, in the film forwarding means of the invention, the film engagement means and the actuation means are normally held in predetermined relative positions through spring means so as to be displaced by the external force with the film engagement means prevented from reverse movement during travel thereof through the reverse prevention means, by which arrangement, only the actuation means can be displaced even when the driving means is in the forwarding position in the shutter releasing period, so that the film units can be forwarded accurately one by one upon releasing of the shutter irrespective of the stopping position of the drive means. Consequently, provision of complicated control mechanism for controlling movement of the rotary drive means is not necessary with resultant simplification of the film forwarding mechanism and reduction in manufacturing cost.

Although the present invention has been fully described by way of example with reference to the attached drawings, it is to be noted that various changes and modifications are apparent to those skilled in the art. Therefore, unless otherwise such changes and modifications depart from the scope of the present invention, they should be construed as included therein.

What is claimed is:

1. In a film forwarding means comprising a film engagement means which includes a first slide plate element which is reciprocally slidable between an initial position and a terminal position and a hook means which is carried on said slide plate element and may engage a film unit engagement portion, whereby said hook means may draw a film unit from an exposure station to another required location in a camera when said slide plate element is moved from said initial position to said terminal position, first spring means constantly urging said slide plate element towards said initial position, retainer means able to retain said slide plate element at said terminal position and disengageable therefrom by means actuated in cooperation with actuation of camera shutter release means, actuation means which is connected to said film engagement means and is moveable in forward and reverse directions, said actuation means being able to cause said film engagement means to move from said initial position to said terminal position during movement thereof in said forward direction, rotary drive means which is rotatable about a fixed axis to drive said actuation means in said forward direction, and power supply means for actuation of said rotary drive means, the improvement wherein: said film forwarding means further comprises second spring means which connects said film engagement means to said actuation means and exerts a constant force to maintain said engagement and actuation means in a certain positional relationship relative to one another, said engagement and actuation means being moveable from said relationship counter to force of said second spring means upon application of a counter force on said actuation means, and reverse prevention means which prevents reverse movement of said film engagement means during travel thereof between said initial and terminal positions.

2. A film forwarding means as recited in claim 1, wherein said actuation means is constituted by a second slide plate element generally equal in dimensions to and slidably positioned parallel to said first slide plate element, said second spring means is a tensions spring, and said reverse prevention means is constituted by a toothed rack portion formed at an edge portion of said first slide plate element and having a length approximately equal to the distance travelled by said first slide plate element during movement thereof between said initial and terminal positions, and a pawl element pivotally mounted beneath said rack portion for engagement with said rack portion and a spring element acting to hold said pawl element vertical with respect to said rack portion.

3. A film forwarding means as recited in claim 1, wherein said film engagement means further includes a first pivotal element connected to said first slide plate element so as to be moveable in a forward direction for causing said first slide plate element to move from said initial position to said terminal position, and which is moveable in a reverse direction by said first slide plate element moving from said terminal position to said initial position with said first pivotal element connected through said second spring means to said actuation means, and said actuation means is constituted by a second pivotal element having a pivot shaft common to said first pivotal element, said second spring means being a wire spring.

* * * * *